United States Patent [19]

Leviton

[11] Patent Number: 5,483,058
[45] Date of Patent: Jan. 9, 1996

[54] HIGH ANGULAR SENSITIVITY, ABSOLUTE ROTARY ENCODING DEVICE WITH POLYGONAL MIRROR AND STAND-ALONE DIFFRACTION GRATINGS

[75] Inventor: Douglas B. Leviton, Dunkirk, Md.

[73] Assignee: The United States of America as represented by the Administrator, National Aeronautics & Space Administration, Washington, D.C.

[21] Appl. No.: 137,706

[22] Filed: Oct. 18, 1993

[51] Int. Cl.⁶ .................................................. G01D 5/34
[52] U.S. Cl. ............................... 250/231.13; 250/231.18; 250/237 G
[58] Field of Search ............................. 250/230, 231.13, 250/231.14, 231.18, 237 G, 235; 356/375

[56] References Cited

U.S. PATENT DOCUMENTS

| | | | |
|---|---|---|---|
| 3,384,754 | 5/1968 | Albarda | 250/224 |
| 4,100,408 | 7/1978 | Marshall | 250/230 |
| 4,490,608 | 12/1984 | Yeadon et al. | 250/235 |
| 5,103,090 | 4/1992 | Weiner et al. | 250/231.13 |
| 5,266,796 | 11/1993 | Leviton | 250/231.18 |
| 5,329,121 | 7/1994 | Leviton | 250/231.13 |

*Primary Examiner*—David C. Nelms
*Assistant Examiner*—Steven L. Nichols
*Attorney, Agent, or Firm*—Paul S. Clohan; Robert D. Marchant

[57] ABSTRACT

A device for position encoding of a rotating shaft in which a polygonal mirror having a number of facets is mounted to the shaft and a monochromatic light beam is directed towards the facets. The facets of the polygonal mirror direct the light beam to a stand-alone low line density diffraction grating to diffract the monochromatic light beam into a number of diffracted light beams such that a number of light spots are created on a linear array detector. An analog-to-digital converter is connected to the linear array detector for reading the position of the spots on the linear array detector means. A microprocessor with memory is connected to the analog-to-digital converter to hold and manipulate the data provided by the analog-to-digital converter on the position of the spots and to compute the position of the shaft based upon the data from the analog-to-digital converter.

16 Claims, 4 Drawing Sheets

FIG. 1 _PRIOR ART_

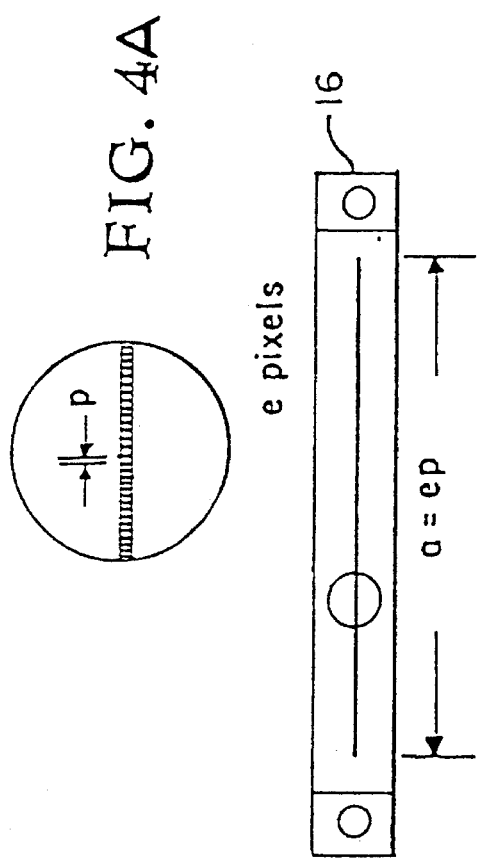
FIG. 4A
FIG. 4B
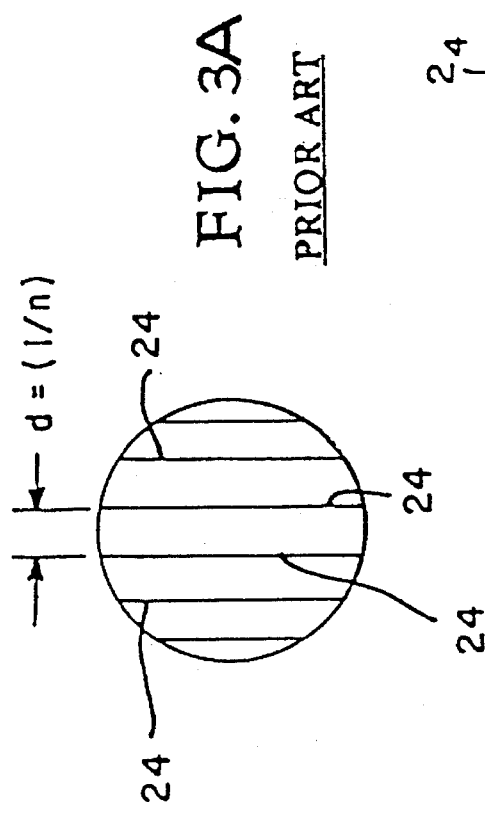
FIG. 3A
PRIOR ART
FIG. 3B
PRIOR ART

HIGH ANGULAR SENSITIVITY, ABSOLUTE ROTARY ENCODING DEVICE WITH POLYGONAL MIRROR AND STAND-ALONE DIFFRACTION GRATINGS

ORIGIN OF THE INVENTION

The invention described herein was made by an employee of the United States Government, and may be manufactured and used by or for the Government for governmental purposes without the payment of any royalties thereon or therefor.

TECHNICAL FIELD

This invention relates generally to rotary encoding devices and more particularly to an absolute rotary encoding device with high angular sensitivity utilizing a polygonal mirror and a stand alone diffraction grating.

CROSS REFERENCE TO RELATED APPLICATIONS

This invention is related to an invention shown and described in U.S. Ser. No. 971,035 (Attorney Docket No. GSC 13,543-1), entitled "*Rotary Encoding Device Using Polygonal Mirror with Diffraction Gratings on Each Facet*", filed in the name of Douglas B. Leviton, the present inventor, on Nov. 3, 1992 and U.S. Ser. No. 08/022,219 (Attorney Docket No. GSC 13,556-1), entitled "*Rotary Encoding Device*", also filed in the name of Douglas B. Leviton on Feb. 25, 1993. The above are assigned to the assignee of the present invention. Moreover, the teachings of these related applications is herein meant to be incorporated by reference.

BACKGROUND ART

Many scientific, industrial, military weapons systems, and aerospace applications require precise and accurate knowledge of the angular orientation of a shaft or other rotating object. Typically, this knowledge is provided by a rotary shaft angle encoder. Encoders of the highest practical precision are relative or incremental in nature, i.e. they resolve very small angular changes and can keep track of accumulated change relative to some reference angle. In these encoders the angular information generally is lost if this reference angle becomes corrupted, e.g., through power interruption or upset by electromagnetic interference. There are also absolute encoders which provide angle information which is independent of any reference angle (except of course its own calibration, traceable to some standards maintenance organization such as NIST—formerly NBS). The absolute nature of these encoders is generally accompanied by only low to moderate angular sensitivity. Those which have the highest sensitivity are exorbitantly expensive ($30,000 to $100,000). Further, some of these encoders often achieve additional sensitivity by means of gear trains which are subject to hysteresis which limit accuracy and make the angular determination indirect. In one of my prior inventions entitled "*Rotary Encoding Device Using Polygonal Mirror with Diffraction Gratings on Each Facet*" (Serial No. 07/971,035 mentioned above), I disclosed a device for position encoding of a rotating shaft in which a polygonal mirror having a number of facets is mounted to the shaft and a monochromatic light beam is directed towards the facets. The facets of the polygonal mirror each have a low line density diffraction grating to diffract the monochromatic light beam into a number of diffracted light beams such that a number of light spots are created on a linear array detector. An analog-to-digital converter is connected to the linear array spots on the linear array detector means. A microprocessor with memory is connected to the analog-to-digital converter to hold and manipulate the data provided by the analog-to-digital converter on the position of the spots and to upon the data from the analog-to-digital converter.

In another of my prior inventions entitled "*Rotary Encoding Device*" (Ser. No. 08/022,219 mentioned above), I disclosed a device for position encoding of a rotating shaft in which a polygonal mirror having a number of facets is mounted to the shaft and a light beam is directed towards the facets. The facets of the polygonal mirror reflect the light beam such that a light spot is created on a linear array detector. An analog-to-digital converter is connected to the linear array detector for reading the position of the spot on the linear array detector. A microprocessor with memory is connected to the analog-to-digital converter to hold and manipulate the data provided by the analog-to-digital converter on the position of the spot and to compute the position of the shaft based upon the data from the analog-to-digital converter. The present invention is an improvement over these two related prior art device.

STATEMENT OF THE INVENTION

It is therefore an object of the present invention to present an improvement to my previously disclosed rotary encoding devices mentioned above.

Another object of the present invention is to present an improved rotary encoding device that has a lower cost, a doubled resolution and has a simpler, more repetitive behavior as compared to my previously disclosed rotary encoding devices.

These and other objects are achieved by providing an encoding device whose operation is based on high order diffraction of light beams, which is not only absolute and direct but will provide angular sensitivity which surpasses the sensitivity of state-of-the-art incremental encoders.

BRIEF DESCRIPTION OF THE DRAWINGS

FIG. 3 is a detail view along lines 3—3 of FIG. 2.

FIG. 4 is a detail view along lines 4—4 of FIG. 2.

DETAILED DESCRIPTION OF THE INVENTION

Prior Art Device

Figure 1:
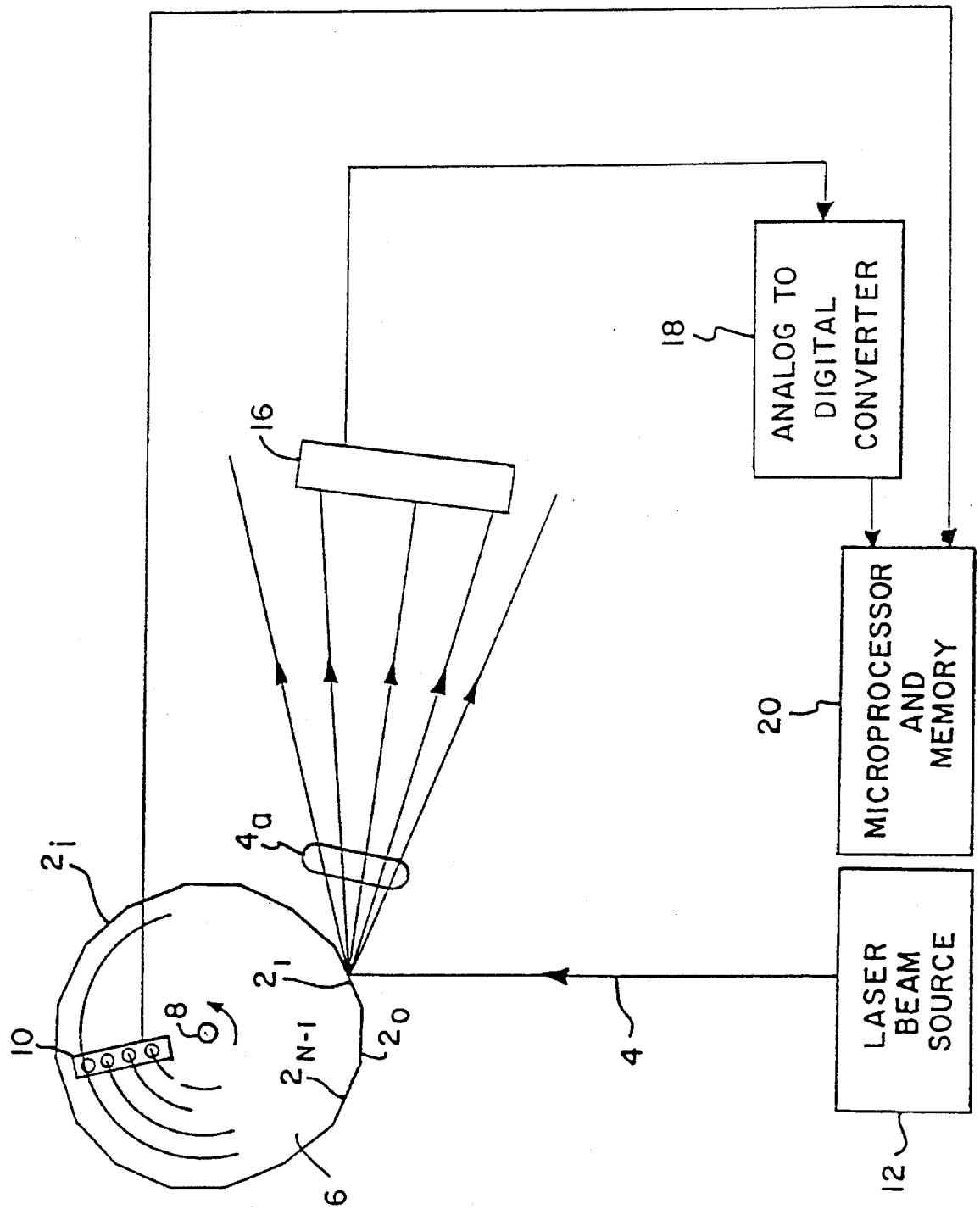
FIG. 1 is a schematic of my prior art rotary encoding device.

FIG. 1 shows a schematic of my prior-art device referred to above (Ser. No. 07/971,035) entitled "*Rotary Encoding Device Using Polygonal Mirror with Diffraction Gratings on Each Facet*". In this prior art device, monochromatic light source 12 is a compact HeNe gas laser or solid state laser which emits light beam 4 and can be delivered by a small diameter fiber optic cable. Light source 12 is thus monochromatic, compact, reliable, and affordable and is directed in the form of a small diameter light beam 4 with low divergence at polygonal mirror 6 which acts as an optical substrate for a multi-faceted diffraction grating, available with very small facet angle errors (subarcsecond) and excellent optical flatness on facets $2_1$–$2_N$. Attached to polygonal mirror 6 is a four-bit binary or Gray code encoder 10 (for facet $2_i$ identification) which is simple, reliable, established and well-understood technology.

A low line density diffraction grating is on each facet $2_i$ of polygonal mirror 6. The diffraction grating is identical on every facet $2_i$, can be patterned holographically for perfect groove periodicity, patterned by photolithography through a mask, or replicated from a blazed mechanically ruled master if higher diffracted efficiency in desired orders is required.

Position sensitive detector 16 can be a CCD array detector having a linear array of a large number of diodes (200–8000) with very small pixels (7–15 μm) providing high speed/ photometrically linear and uniform response to monochromatic light beam 4 provided by laser 12, and has high electronic throughput and is reliable. Detector 16 could also be an area array detector. Connected to detector 16 is $12^+$ bit analog-to-digital converter 18 to read out the linear array of diodes in detector 16. A floating point microprocessor 20 with double precision math processing capability and memory to hold and manipulate array detector 16 data is used and will compute shaft 8 angle absolutely based on information from facet identifying encoder 10, and positions of diffracted light spots on linear array detector 16. Microprocessor 20 is currently available in many forms with high speed and reliability and more than adequate computing capacity.

The operation of my prior art encoder relied on the analytically established, non-linear behavior of the angles of diffracted light beams $4_a$ (orders) from a diffraction grating 22 (FIG. 3) as the angle of incidence of light beam 4 on grating 22 is varied. The classical equation governing this behavior is the famous "grating equation" and is expressed as follows:

$$m \lambda/d = \sin\alpha + \sin\beta \qquad (EQ.1)$$

where m is an integer (order number), $\lambda$ is the wavelength of light, d is the distance between adjacent grooves 24 of grating 22 (here I are assuming that all grooves 24 are straight, parallel, and equally spaced), $\alpha$ is the angle of incidence of light beam 4 with respect to the normal to grating 22 surface, and $\beta$ is the angle from that normal into which light beam 4 diffracts for the given order m.

Figure 2:
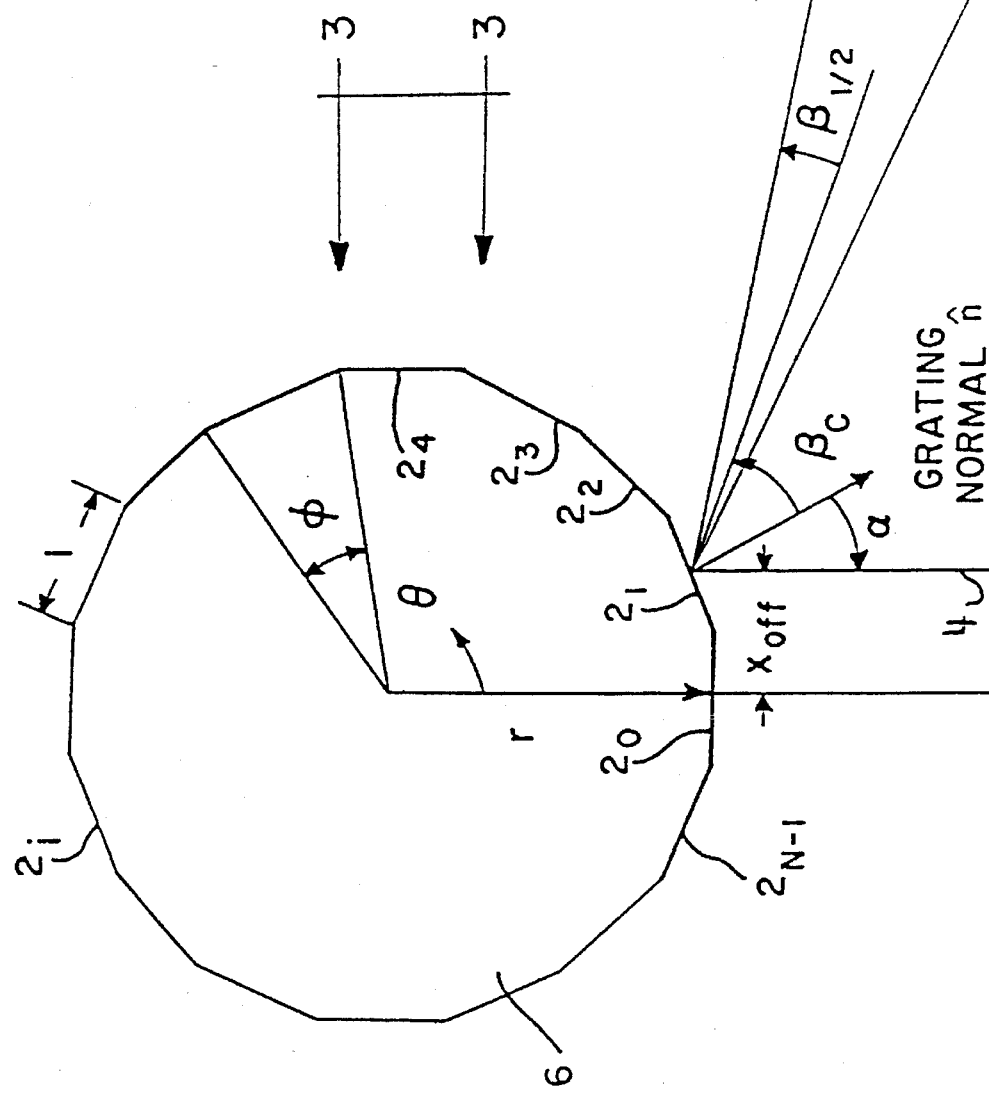
FIG. 2 is a detail view of the geometry involved in the prior art encoding device shown in FIG. 1.

To begin the description of my prior art encoder's operation, for conceptual reasons only, I assume two simple things: first, that light beams can be thought of as geometric rays; and second, that the first time we see the situation in FIG. 1, shaft 8 angle $\Theta$ (see FIG. 2) is such that incident light beam 4 is just intersecting the upper fight end of facet $2_1$. I will begin by considering counterclockwise shaft 8 motion (positive sense for $\Theta$). Thus, incident beam 4 from light source 12 in FIG. 1 will seem to creep down facet $2_1$, changing its angle of incidence on facet $2_1$, as shaft 8 rotates.

The basic, observable phenomenon in my prior art system will be spots of light on linear array detector 16 where diffracted beams $4_a$ (orders) intersect the line segment in space which is the linear array. At any instant in time, shaft 8 angle information is in fact determinable by the exact locations of these spots on the linear array, i.e. the intersections of rays $4_a$ with the line segment.

To see why this is so, consider the following: as shaft 8 (and polygonal mirror 6) rotates through an angle $\Delta\Theta$, the angle of incidence $\alpha$ of monochromatic source 12 light beam 4 with respect to facet $2_1$ normal changes by $\Delta\alpha$, which is exactly $=\Delta\Theta$, which causes the angular distribution of the diffracted light beams $4_a$ to change. Two crucial things happen to the light spots on the linear array detector 16. First, they move. They do so in such a way as to continue to satisfy the grating equation which is related to the second thing. Due to the non-linear nature of the grating equation, the distance between the spots changes. It is this aspect of the encoder's behavior which distinguishes it from incremental encoders and allows it to uniquely identify a shaft 8 angle within the angular range defined by the intersection of the incident source beam 4 and any identical facet $2_i$.

The behavior just described continues until the next facet $2_0$ comes around, at which point the behavior repeats itself. The desired behavior is called "modulo $2\pi/N$," where N is the number of facets $2_i$ on polygonal mirror 6 and $2\pi/N$ is called the "sector angle" in radians. The absolute shaft 8 angle is obtained by knowing the angular offset for the illuminated facet 2 and adding the uniquely defined angular component governed by the grating equation and manifested in the locations of light spots on the linear array detector 16. The angular offset is simply the facet $2_i$ number times the sector angle, where facets $2_i$ are numbered 0 through N-1. The angular component depending on the grating equation is computed from knowledge of the gratings' line density (inverse groove 24 spacing d), source 12 wavelength $\lambda$, and geometric concerns which are assumed to be invariant. These geometric aspects are polygonal mirror 6 dimensions, linear array 16 placement, and offset distance from shaft 8 center where incident beam 4 strikes polygonal mirror 6, defined as $X_{off}$.

To complete the description of my prior art system, the location information of the light spots on array detector 16 is read from array 16 by conventional means through analog-to-digital converter 18 under the control of microprocessor 20 into microprocessor 20 memory. Once the information is in memory, it is processed or otherwise manipulated to determine shaft 8 angle through the implementation of appropriate algorithms and stored calibration data. This process can be carried out continuously many, many times per second.

Present Invention

Figure 5:
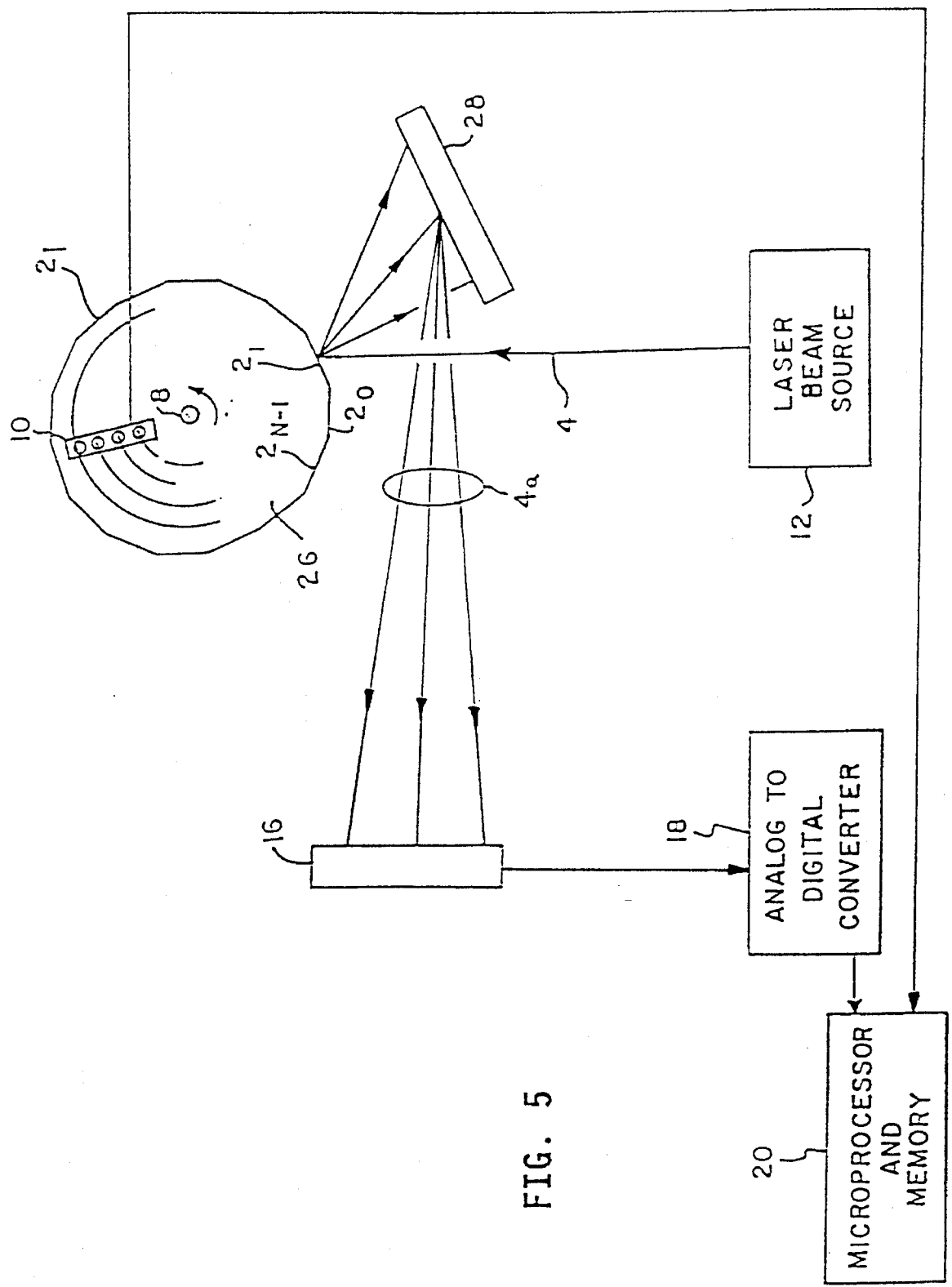
FIG. 5 is a schematic of an Improved High Angular Sensitivity, Absolute Rotary Encoding Device according to the teachings of the present invention.

Referring now to FIG. 5, in this improved device, monochromatic light source 12 is also a compact HeNe gas laser or solid state laser (e.g., laser diode-pumped, frequency-doubled Nd:YAG or Nd:YLF) which emits light beam 4 and can be delivered by a small diameter fiber optic cable. As in my prior art device, light source 12 is thus monochromatic, compact, reliable, and affordable and is directed in the form of a small diameter light beam 4 with low divergence at polygonal mirror 26, available with very small facet angle errors (subarcsecond) and excellent optical flatness on facets $2_1$–$2_N$. Attached to polygonal mirror 26 is a four-bit binary or Gray code encoder 10 (for facet $2_i$ identification) which is simple, reliable, established and well-understood technology.

A low line density diffraction grating 28 is separated from mirror 26 in my improved device. Diffraction grating 28 can be patterned holographically for perfect groove periodicity, patterned by photolithography through a mask, or replicated from a blazed mechanically ruled master if higher diffracted efficiency in desired orders is required.

As in my prior art device, position sensitive detector 16 can be a CCD array detector having a linear array of a large number of diodes (200–8000) with very small pixels (7–15 μm) providing high speed/photometrically linear and uniform response to monochromatic light beam 4 provided by laser 12, and has high electronic throughput and is reliable.

Detector 16 could also be an area array detector. Connected to detector 16 is 12⁺ bit analog-to-digital converter 18 to read out the linear array of diodes in detector 16. A floating point microprocessor 20 with double precision math processing capability and memory to hold and manipulate array detector 16 data is used and will compute shaft 8 angle absolutely based on information from facet identifying encoder 10, and positions of diffracted light spots on linear array detector 16. Microprocessor 20 is currently available in many forms with high speed and reliability and more than adequate computing capacity. While the operation of my improved device still relies on the analytically established, non-linear behavior of the angles of diffracted light beams $4_a$ (orders) from a stand alone diffraction grating 28 as a function of angle of incidence of a light beam 4 on grating 28 (see equation 1), the previous device and the improved device implement this relation differently owing to their different geometries.

The prior art polygonal mirror 6 which was ruled or patterned with light diffracting gratings shown in FIG. 1 is rather expensive, ≈$15,000 to $20,000 and time consuming to produce. In contrast, for my improved device, the cost of separated polygonal mirror 26 and stand alone grating 28 is, taken together, only $3,000 to $5,000 and far more easy to manufacture.

In my previous device, the range of angles of incidence on the surfaces of the diffraction gratings was exactly equal to the sector angle of the polygon grating (the angle between adjacent facet centers or alternately the included angle between the polygon's center and two adjacent polygon vertices). In contrast, with my improved device, because the light incident on stand-alone grating 28 has first been deflected by rotating polygonal mirror 26 facets $2_i$, the range of angles of incidence on grating 28 is doubled compared to the previous geometry allowing twice as much flexibility in design parameters. This flexibility in design parameters leads to overall enhanced sensitivity for a fixed package generally by a factor of two. For example, for a fixed geometry, many more orders would cross the encoder's detector array 16 while a facet $2_i$ is traversed by the incident light beam 4; or grating's 28 ruling density could be doubled with no change in performance except that grating 28 might be able to be made with higher quality and more easily; or the distance between grating 28 and detector array 16 could be shortened giving a more compact package of otherwise equal performance.

Finally, the fact that, for my improved device, only the behavior of one diffraction grating 28 need be characterized and then its behavior would repeat for each polygon mirror 26 facet $2_i$ is advantageous compared to having to characterize and keep track of potentially different behaviors for each diffraction grating for all facets of my prior art device.

To those skilled in the art, many modifications and variations of the present invention are possible in light of the above teachings. It is therefore to be understood that the present invention can be practiced otherwise than as specifically described herein and still will be within the spirit and scope of the appended claims.

I claim:

1. A device for encoding the angular displacement of a rotating shaft about its axis of rotation comprising:

a polygonal mirror having a plurality of facets thereon affixed to said shaft;

a monochromatic light beam directed towards said facets;

said facets of said polygonal mirror each reflecting said light beam to a stand alone low line density diffraction grating to diffract said monochromatic light beam into a plurality of diffracted light beams such that a plurality of light spots are created on a position sensitive detector means;

an analog-to-digital converter means connected to said detector means for reading the position of said spots on said detector means;

processing and memory means connected to said analog-to-digital converter means to hold and manipulate data provided by said analog-to-digital converter means on the position of said spots and to compute the angular displacement of said shaft about its axis of rotation based upon the data from said analog-to-digital converter means.

2. The device of claim 1 further including a binary code encoder affixed to said polygonal mirror for identification of one of said plurality of facets.

3. The device of claim 2 wherein said monochromatic light beam is emitted by a gas laser.

4. The device of claim 2 wherein said monochromatic light beam is emitted by a solid state laser.

5. The device of claim 2 wherein said monochromatic light beam is emitted by a gas source and suitably monochromated by optical filtration or dispersion.

6. The device of claim 4 wherein said monochromatic light beam is directed towards said facets by a fiber optic cable employing beam shaping optics.

7. The device of claim 1 wherein said low line density diffraction grating is patterned holographically.

8. The device of claim 1 wherein said low line density diffraction grating is patterned by replication from a blazed mechanically ruled master.

9. The device of claim 1 wherein said low line density diffraction grating is patterned by photolithographic means involving a mask.

10. The device of claim 1 wherein said low line density diffraction grating is patterned by a molding process.

11. The device of claim 1 wherein said position sensitive detector means comprises a linear array detector means.

12. The device of claim 1 wherein said position sensitive detector means comprises an area array detector means.

13. The device of claim 11 wherein said linear array detector means contains a large plurality of diodes with very small pixel size.

14. The device of claim 13 wherein said plurality of diodes is in the range of 200 to 8000 and said pixel size is in the range of 7–15 μm.

15. The device of claim 1 wherein said polygonal mirror has a number of facets thereon which are a power of 2.

16. The device of claim 15 wherein said polygonal mirror has 16 facets thereon.

* * * * *